United States Patent
Enoki

(10) Patent No.: US 6,778,815 B1
(45) Date of Patent: Aug. 17, 2004

(54) MOBILE RADIO TERMINAL APPARATUS

(75) Inventor: Masayuki Enoki, Hino (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 646 days.

(21) Appl. No.: 09/717,207

(22) Filed: Nov. 22, 2000

(30) Foreign Application Priority Data

Nov. 24, 1999 (JP) .......................... 11-333375
Dec. 27, 1999 (JP) .......................... 11-371763

(51) Int. Cl.[7] .............................. H04B 7/00
(52) U.S. Cl. ............ 455/277.2; 455/63.1; 455/67.13
(58) Field of Search ................... 455/278.1, 277.2, 455/403, 39, 513, 526, 63.1, 67.11, 67.13, 73, 550.1, 562.1, 277.1

(56) References Cited

U.S. PATENT DOCUMENTS

| | | | |
|---|---|---|---|
| 5,530,926 A | | 6/1996 | Rozanski |
| 5,812,542 A | * | 9/1998 | Bruckert et al. ............ 370/335 |
| 6,018,651 A | * | 1/2000 | Bruckert et al. .......... 455/277.1 |
| 6,023,615 A | * | 2/2000 | Bruckert et al. .......... 348/14.08 |
| 6,229,797 B1 | * | 5/2001 | Cho ........................... 370/342 |
| 6,256,501 B1 | * | 7/2001 | Tokuyama et al. .......... 455/442 |
| 6,327,481 B1 | * | 12/2001 | Nagashima .............. 455/562.1 |
| 6,539,205 B1 | * | 3/2003 | Wan et al. ................... 370/465 |
| 6,625,202 B1 | * | 9/2003 | Sudo et al. .................. 375/147 |

FOREIGN PATENT DOCUMENTS

| | | |
|---|---|---|
| EP | 0227458 A2 | 7/1987 |
| GB | 2178269 A | 2/1987 |
| GB | 2307831 A | 6/1997 |
| JP | 09-181664 | 7/1997 |
| KR | 10-211475 | 6/1997 |
| WO | WO 95/13670 A1 | 5/1996 |
| WO | 09-181664 | 7/1997 |

OTHER PUBLICATIONS

Katsumi Hirai et al., "CDMA System Mobile Radio Terminal Equipment", National Phase Application No. PCT/JP99/07294, U.S. Application Ser. No. 09/623,137, filed Aug. 28, 2000.

* cited by examiner

Primary Examiner—Sonny Trinh
(74) Attorney, Agent, or Firm—Finnegan, Henderson, Farabow, Garrett & Dunner, L.L.P.

(57) ABSTRACT

A control section comprises receiving energy estimating means for estimating Ec/Io of a receiving signal and switch change control means for changing antennas, in order to implement new control functions. If Ec/Io of the signal received via a selected antenna is lower than a preset level at the incoming or outgoing call time or at the communication time, reception is temporarily executed via the other antenna to detect Ec/Io. After that, the antenna having preferable Ec/Io is employed for the reception.

4 Claims, 8 Drawing Sheets

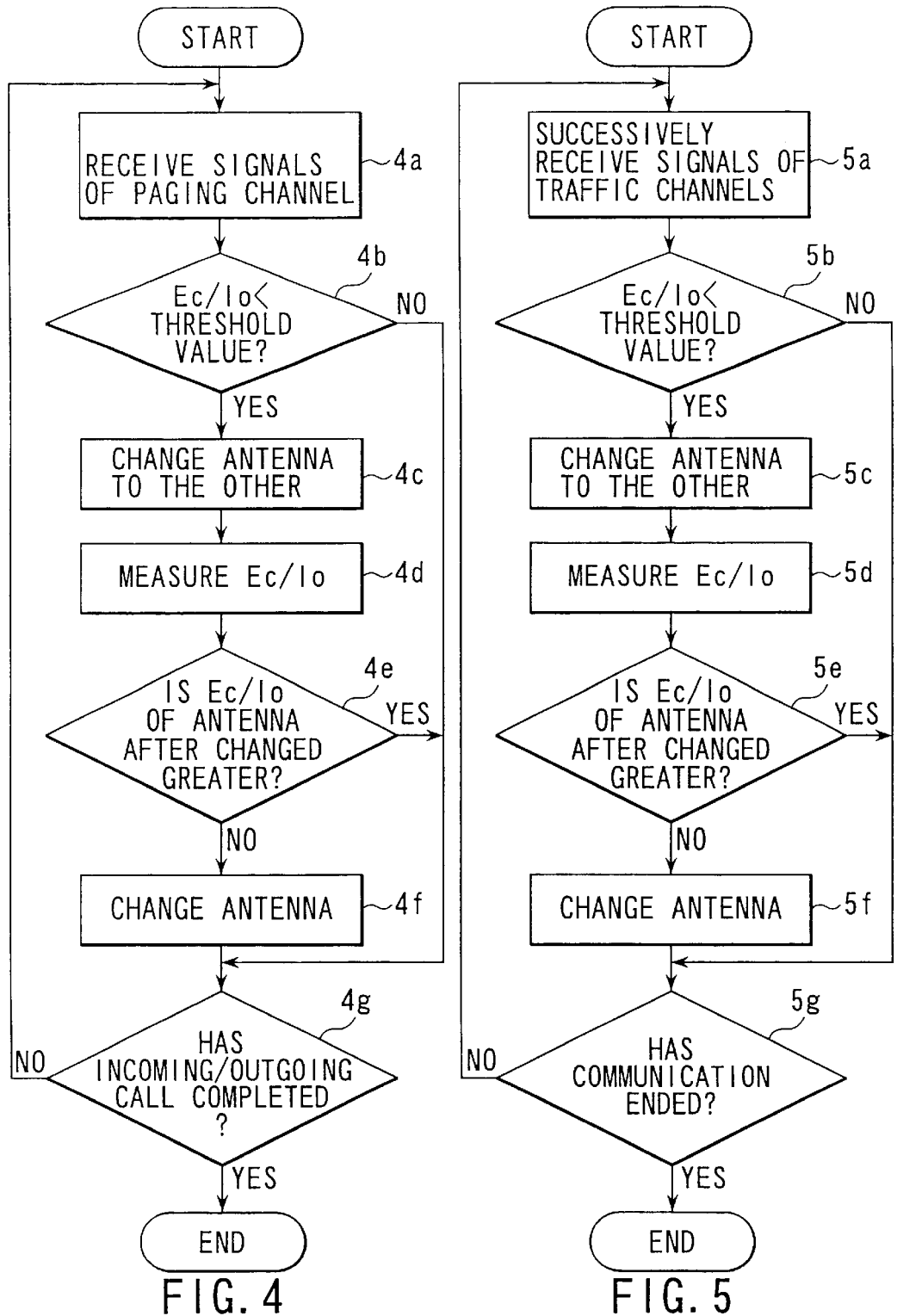

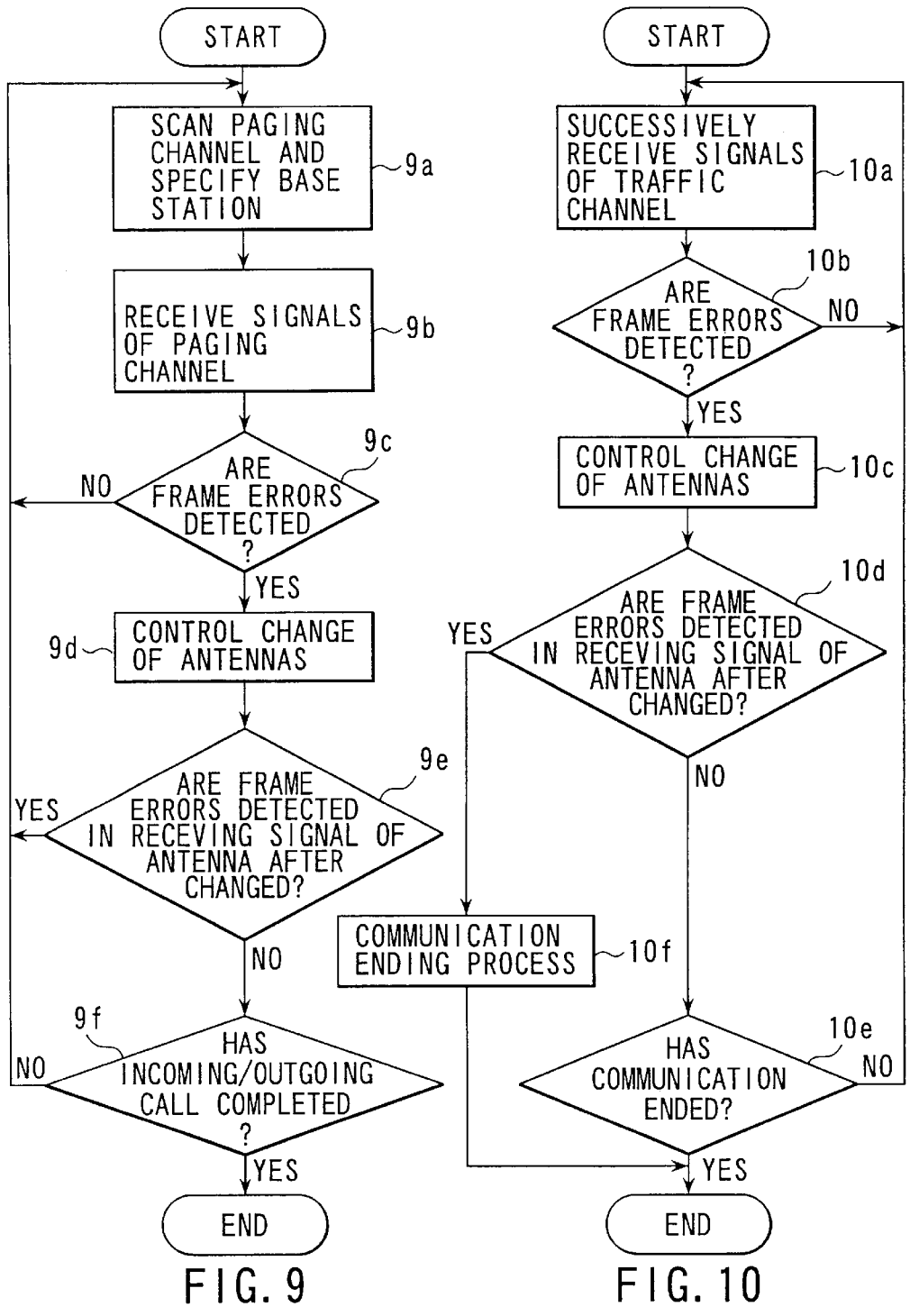

MOBILE RADIO TERMINAL APPARATUS

CROSS-REFERENCE TO RELATED APPLICATIONS

This application is based upon and claims the benefit of priority from the prior Japanese Patent Applications No. 11-333375, filed Nov. 24, 1999; and No. 11-371763, filed Dec. 27, 1999, the entire contents of which are incorporated herein by reference.

BACKGROUND OF THE INVENTION

This invention relates to a mobile radio terminal apparatus in the Code Division Multiple Access (CDMA) scheme for use in a mobile radio communication system such as a mobile telephone system or a portable telephone system.

Recently, a mobile radio communication system employing the CDMA scheme has been noticed. This system employs the spread spectrum communication scheme as the communication scheme thereof.

A conventional mobile radio terminal apparatus in the mobile communication system will be explained with reference to FIG. 1. The receiving system relating to the invention will be mainly explained here.

A transmitting device 12 modulates the transmission data of the speech communication, data communication and the like in the digital modulation scheme such as the PSK modulation and spreads the modulated data to a broad-band baseband signal by using a spread code.

The transmitting device 12 up-converts the baseband signal to a radio-frequency signal, inputs the signal to a first antenna 10 via a duplexer 11, and irradiates the signal into the space from the first antenna 10 to transmit the signal to a base station (not shown).

On the other hand, the radio signal transmitted from the base station is received by the first antenna 10 and input to a receiving device 13 via the duplexer 11. The receiving device 13 is composed of a radio circuit 14, an intermediate frequency circuit 15 and a RAKE receiver 16.

First, in the radio circuit 14, the radio signal received from the duplexer 11 is input to an attenuator 14a, which attenuates the signal at a preset amount.

The signal passing through the attenuator 14a is amplified up to a predetermined level by an amplifier 14b, mixed with a signal generated by a frequency synthesizer 14d in a mixer 14c and then down-converted to an intermediate frequency.

The signal down-converted to the intermediate frequency is input to the intermediate frequency circuit 15 and amplified up to a predetermined level by an amplifier 15a. A desired band, of the result of the amplification, passes through a band-pass filter (BPF) 15b and is input to a mixer 15c.

In the mixer 15c, the signal which has passed through the band-pass filter 15b and a signal generated by a frequency synthesizer 15d are mixed and converted to a baseband signal. The baseband signal converted to a digital signal by an A/D converter (A/D) 15e and input to the RAKE receiver 16.

The RAKE receiver 16 is composed of a searcher 16a, fingers 16b, 16c and 16d, and a symbol combiner 16e. The digital signal is input to the searcher 16a and also to the fingers 16b, 16c and 16d.

The searcher 16a despreads the digital signal at various timings by using the same spread code as that used for the spreading on the transmitting side, in order to execute the detection of signals arriving in a plurality of paths from the base station to its own terminal, or what is called multi-pass detection.

The searcher 16a obtains Ec/Io (Io: spectral density of overall electric power in the receiving range, Ec: pilot energy stored during a PN chip period) of a plurality of paths and a delayed time difference (delay profile) of these paths from the result of the despreading. On the basis of these, the searcher 16a obtains a receiving timing (despread timing) of a path suitable for the reception and assigns it to each of the fingers 16b, 16c and 16d.

The fingers 16b, 16c and 16d despread the digital signal by using the same spread code as that used in the spreading on the transmitting side, at the despreading timings assigned by the searcher 16a.

The symbol combiner 16e symbolically combines the multi-pass components respectively despread by fingers 16b, 16c and 16d by considering the despreading timings assigned to the respective fingers 16b, 16c and 16d.

The signal symbolically combined in the symbol combiner 16e is subjected to the demodulation corresponding to the digital modulation of the transmitting side in a signal processing section 17 of the rear stage and thereby the receiving data is reproduced.

In this mobile radio terminal apparatus, a control section (not shown) executes the control operation for the handoff, in accordance with the value of Ec/Io of the pilot signal obtained in the searcher 16a.

When the intermittent reception is executed in a reception standby state under this control, if the value of Ec/Io satisfies conditions that (1) the value is smaller than a predetermined value, (2) the value is more deteriorated than a predetermined value as compared with the previous receiving time, (3) a difference between the value and Ec/Io of a neighboring base station becomes within a predetermined value, and the like, Ec/Io of the pilot signal from the other base station is measured to execute the hand off. If Ec/Io of the pilot signal of the other base station becomes greater than the predetermined value, the signal is handed off to the other base station.

If Ec/Io of the pilot signal of the currently connected base station becomes smaller than the predetermined value and if Ec/Io of the pilot signal of the neighboring base station becomes greater than the predetermined value while the mobile radio terminal apparatus executes the communication, the mobile radio terminal apparatus executes the hand off while having communication with a plurality of base stations including the base station satisfying the determined conditions.

The above-described CDMA scheme have advantages that (1) the scheme is superior in the secrecy of communication as the spread spectrum technique is employed, (2) the scheme has high resistance to fading as the Rake receiving scheme is employed, (3) the scheme is capable of stable handoff including no instantaneous interruption of communication or what is called soft handoff, and the like.

In the conventional mobile radio terminal apparatus in the CDMA scheme, however, the multi-pass resolution of the searcher 16a is determined in accordance with the reciprocal of the chip rate, i.e. one PN chip period. Therefore, if the extension of the multi-pass delay time is smaller than the resolution, the multi-pass components cannot be separated respectively at the fingers 16b, 16c and 16d or symbolically synthesized.

That is, extension of the delay time of the multipass (direct wave, first reflected wave and second reflected wave)

received by the fingers 16b, 16c and 16d is small, and the Rake reception cannot be executed if the multipass is not delayed by more than the reciprocal of the chip rate.

Thus the reflected wave which is more delayed than the direct wave cannot be reproduced in accordance with the delay time difference in the multipass. Therefore, there is a problem that the resistance to fading is deteriorated and stable communication quality cannot be maintained. This problem arises more remarkably in a low-speed motion such as walking or a stationary condition than in a high-speed motion.

In addition, if the multipass fading occurs under the condition that the Rake reception cannot be executed as the multipass delay time is small, so as to detect a predetermined number of frame errors in the pilot signal from the current base station even temporarily, it is estimated that the system is lost and the process starts from the system capture.

The reception is executed at a location where the receiving energy is accidentally deteriorated due to the influence of the fading as shown in FIG. 2.

As described above, if it is estimated that the system is lost and the process starts again from the system capture, the communication will be interrupted during the communication time. At the standby time, "out of communication range" is displayed and it will take much time to become in the standby condition. These cause the battery to be wasted unnecessarily.

BRIEF SUMMARY OF THE INVENTION

The first object of the present invention is to provide a mobile radio terminal apparatus in the CDMA scheme capable of maintaining the stable communication quality even in a radio wave atmosphere in which terrible fading occurs.

To achieve the first object, the mobile radio terminal apparatus of the present invention is capable of making radio connection in the CDMA scheme to one of a plurality of radio base stations connectable to a communication network to conduct communication with a communication station in the communication network, and comprises two antennas, antenna selection means for selecting one of the two antennas as an antenna which is to be used, in accordance with a control signal, receiving means for receiving a signal transmitted from the radio base station via the antenna selected by the antenna selection means, receiving energy estimating means for obtaining a ratio of a pilot energy stored in a preset period to a spectral density of entire electric power in a receiving range, of the signal received by the receiving means, and antenna change control means, in a case where receiving quality of the signal received by the receiving means is lower than a predetermined value after an incoming call signal is received from the radio base stations, at the time of transmitting an outgoing signal to the radio base stations, or during the communication with the radio base stations, for supplying the control signal to the antenna selection means, changing the antenna in use from the antenna selected by the antenna selection means to the other antenna for the reception, comparing the ratios obtained by the receiving energy estimating means before and after the change of the antennas, and supplying the control signal to select the antenna having the larger ratio to the antenna selection means.

In the above-constituted mobile radio terminal apparatus, if the receiving quality is lower than the predetermined value after an incoming signal is received from the radio base station, at the time of transmitting an outgoing signal to the radio base station, or during the communication with the radio base station, the control signal is supplied to the antenna selection means, the antenna in use is changed from the antenna selected by the antenna selection means to the other antenna for the reception, the ratios obtained by the receiving energy estimating means are compared before and after the change of the antennas, and the antenna having the larger ratio is selected.

Thus, according to the above-constituted mobile radio terminal apparatus, the antenna having the larger ratio is selected even in a radio wave atmosphere in which terrible fading occurs, at the outgoing or incoming time or at the communication time, and therefore the stable communication quality can be maintained.

Further, to achieve the first object, the mobile radio terminal apparatus of the present invention is capable of making radio connection in the CDMA scheme to one of a plurality of radio base stations connectable to a communication network to conduct communication with a communication station in the communication network, and comprises two antennas, antenna selection means for selecting one of the two antennas as an antenna which is to be used, in accordance with a control signal, receiving energy estimating means for obtaining a ratio of a pilot energy stored in a preset period to a spectral density of entire electric power in a receiving range, of the signal received via the antenna selected by the antenna selection means, and antenna change control means for sequentially changing the two antennas and executing the reception via the respective antennas, prior to a receiving timing preliminarily assigned to the own apparatus at an incoming call standby time, comparing the ratios obtained by the receiving energy estimating means before and after the change of the antennas, and supplying the control signal to select the antenna having the larger ratio to the antenna selection means.

In the above-constituted mobile radio terminal apparatus, two antennas are sequentially changed and the reception is executed via the respective antennas, prior to a receiving timing preliminarily assigned to the own apparatus at the incoming call standby time, the ratios obtained by the receiving energy estimating means before and after the change of the antennas are compared, and the antenna having the larger ratio is selected.

Thus, according to the above-constituted mobile radio terminal apparatus, the antenna having the larger ratio is selected even in a radio wave atmosphere in which terrible fading occurs, at the incoming call standby time, and therefore the stable communication quality can be maintained and the first object can be achieved.

The second object of the present invention is to provide a mobile radio terminal apparatus capable of maintaining the stable communication quality and preventing "system lost" even in a radio wave atmosphere in which the multipass delay time is short and terrible fading occurs.

To achieve the second object, the mobile radio terminal apparatus of the present invention is capable of making radio connection in the CDMA scheme to one of a plurality of radio base stations connectable to a communication network to conduct communication with a communication station in the communication network, and comprises two antennas, antenna selection means for selecting one of the two antennas as an antenna which is to be used, in accordance with a control signal, frame error estimating means for demodulating a signal received via the antenna selected by the antenna selection means and estimating whether or not a predetermined number of frame errors are successively generated in the result of the demodulation, and antenna change control means, in a case where it is estimated by the frame error estimating means that a predetermined number of frame errors are successively generated, for supplying the control signal to the antenna selection means and changing the antenna in use from the antenna selected by the antenna selection means to the other antenna.

In addition, a mobile radio terminal apparatus according to the present invention is capable of making radio connection in the CDMA scheme to one of a plurality of radio base stations connectable to one of a communication network to conduct communication with a communication station in the communication network, and comprises two antennas, antenna selection means for selecting one of the two antennas as an antenna which is to be used, in accordance with a control signal, frame error estimating means for demodulating a signal received via the antenna selected by the antenna selection means and estimating whether or not frame errors are successively generated in the result of the demodulation in more than a predetermined time, and antenna change control means, in a case where it is estimated by the frame error estimating means that frame errors are successively generated during more than a predetermined period, for supplying the control signal to the antenna selection means and changing the antenna in use from the antenna selected by the antenna selection means to the other antenna.

According to the above-constituted mobile radio terminal apparatus, when more than a predetermined number of frame errors of the receiving signal are successively generated or frame errors are successively generated in more than a predetermined time, the antenna in use is changed from the antenna selected by the antenna selection means to the other antenna to execute the reception.

That is, when the frame errors of the receiving signal are successively generated in more than a predetermined time or more than a predetermined number of frame errors are successively generated, even temporarily, by the multipass fading, so that stable communication quality cannot be maintained, the reception can be executed by employing the other antenna.

Thus, as the position where the RF signal from the space is received is changed by the distance between two antennas, the RF signal receiving little influence of the fading can be received via the other antenna.

Therefore, according to the above-constituted mobile radio terminal apparatus, it is possible to maintain the stable communication quality and prevent "system lost" even in a radio wave atmosphere in which the multipass delay time is short and terrible fading occurs, and thereby the second object of the present invention can be achieved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a flow chart explaining an antenna change control operation at the calling in the mobile radio terminal apparatus shown in FIG. 3;

FIG. 5 is a flow chart explaining an antenna change control operation at the communication in the mobile radio terminal apparatus shown in FIG. 3;

FIG. 9 is a flow chart explaining an antenna change control operation at the calling in the mobile radio terminal apparatus shown in FIG. 8;

FIG. 10 is a flow chart explaining an antenna change control operation at the communication in the mobile radio terminal apparatus shown in FIG. 8;

DETAILED DESCRIPTION OF THE INVENTION

The embodiments of the present invention will be explained below with reference to the drawings.

Figure 1:
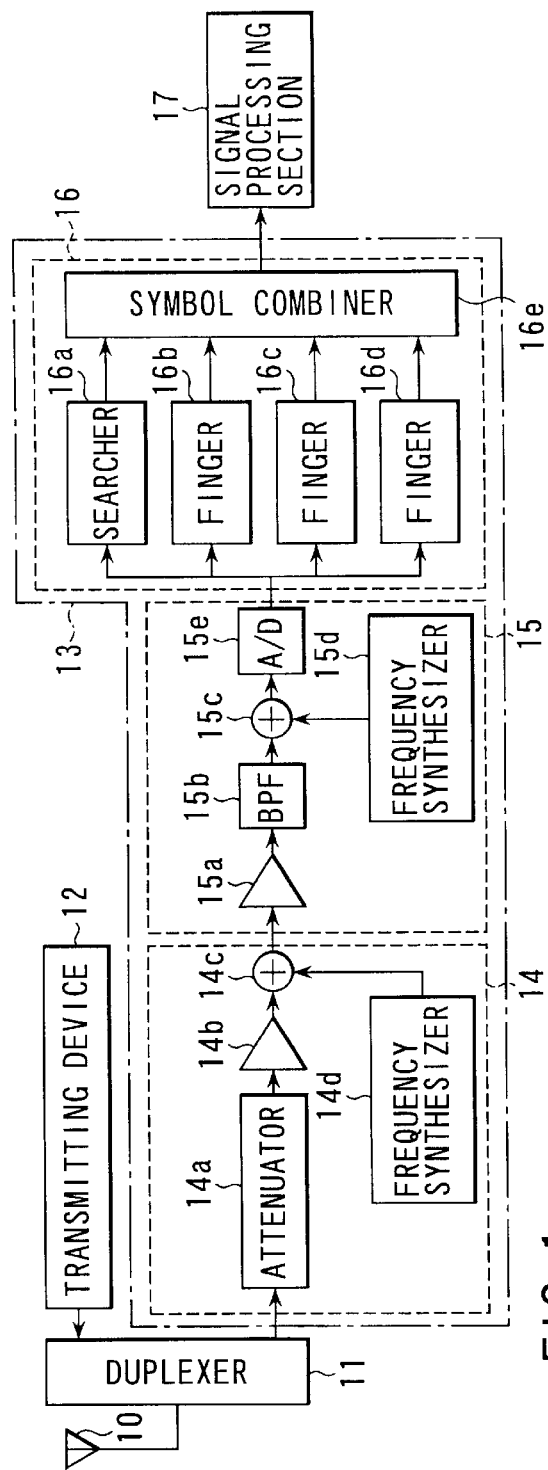
FIG. 1 is a block diagram showing a configuration of a conventional mobile radio terminal apparatus.
Figure 2:
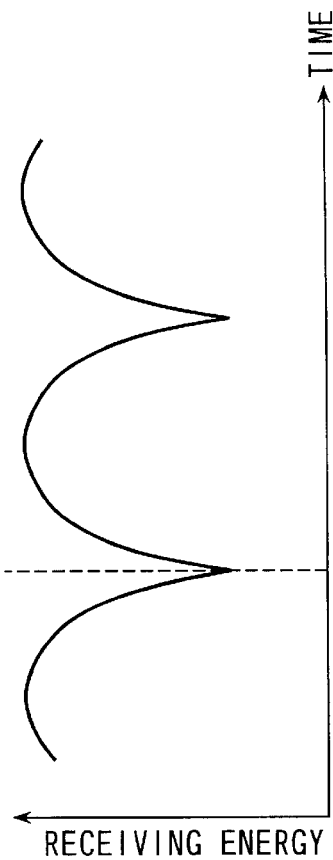
FIG. 2 is a diagram explaining the occurrence of a problem in the conventional mobile radio terminal apparatus.
Figure 3:
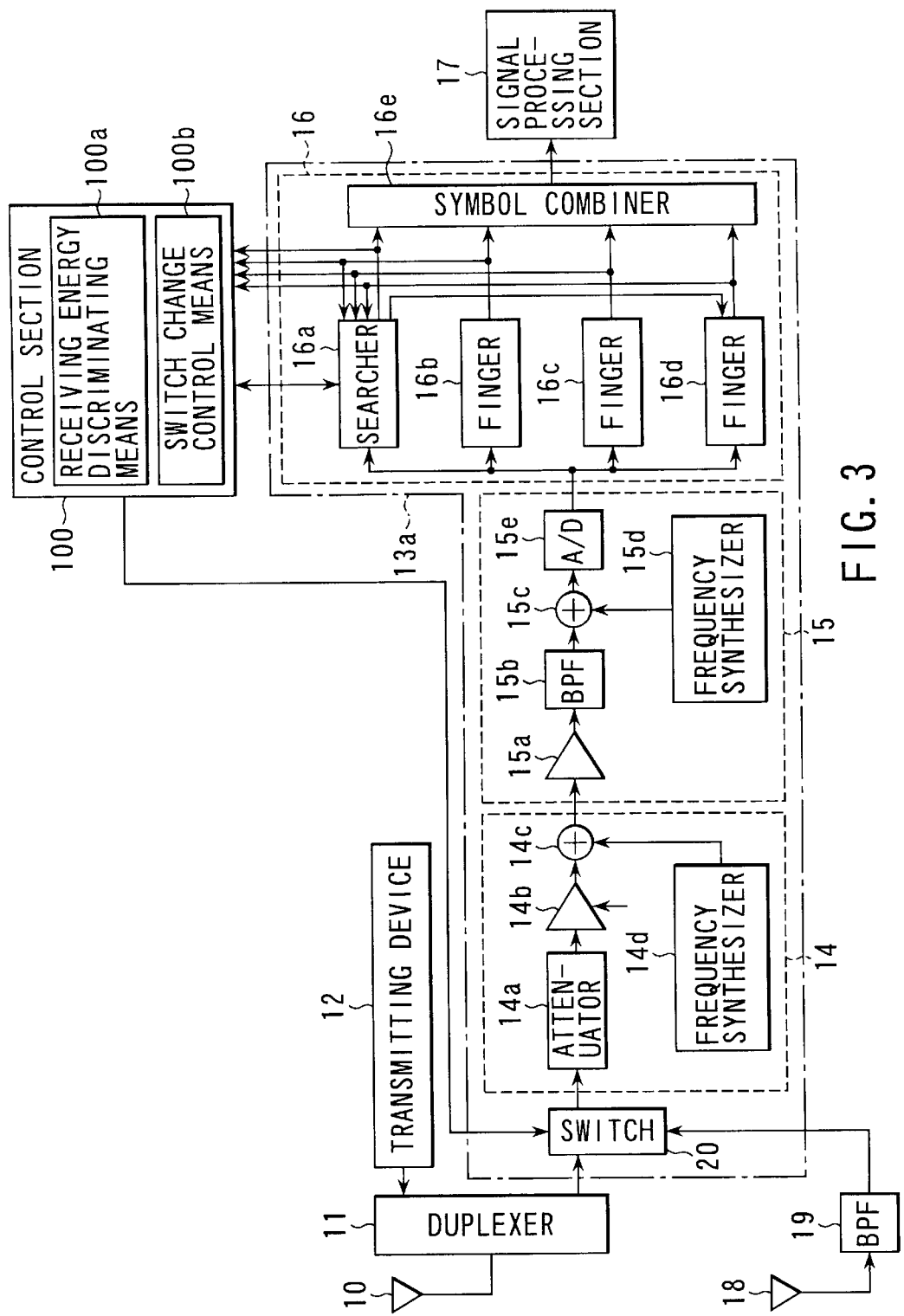
FIG. 3 is a block diagram showing a configuration of a mobile radio terminal apparatus in the CDMA scheme according to the first embodiment of the present invention.

FIG. 3 shows a configuration of a mobile radio terminal apparatus in the CDMA scheme according to the first embodiment of the present invention. In FIG. 3, the same portions as those in FIG. 1 that illustrates the configuration of the conventional mobile radio terminal apparatus in the CDMA scheme are denoted by the same reference numerals, and the receiving system of the present invention will be particularly explained here.

A transmitting device 12 modulates the transmission data of the speech communication, data communication and the like in the digital modulation scheme such as the PSK modulation and spreads the modulated data to a broad-band baseband signal by using a spread code.

Then, the transmitting device 12 up-converts the baseband signal to a radio-frequency signal, inputs the signal to a first antenna 10 via a duplexer 11, and irradiates the signal into the space from the first antenna 10 to transmit the signal to a base station (not shown).

On the other hand, the radio signal transmitted from the base station is received by the first antenna 10 and input to a receiving device 13a via the duplexer 11. The receiving device 13a is composed of a switch 20, a radio circuit 14, an intermediate frequency circuit 15 and a Rake receiver 16.

First, the receiving signal which is input from the duplexer 11 and a receiving signal which is received by a second antenna 18 and limited in a desired band by a band-pass filter (BPF) 19 are input to the switch 20. The change operation is controlled by a control section 100 to be described later and any one of the two receiving signals is input to the radio circuit 14.

The second antenna 18 is provided inside a casing of the mobile radio terminal apparatus.

In the radio circuit 14, the radio signal received from the switch 20 is input to an attenuator 14a, which attenuates the signal at a preset amount. The signal passing through the attenuator 14a is amplified up to a predetermined level by an amplifier 14b, mixed with a local oscillation signal generated by a frequency synthesizer 14d in a mixer 14c. The mixed signal is down-converted to an intermediate frequency.

The signal down-converted to the intermediate frequency is input to the intermediate frequency circuit 15 and amplified up to a predetermined level by an amplifier 15a. A desired band, of the result of the amplification, passes through a band-pass filter (BPF) 15b and is input to a mixer 15c.

In the mixer 15c, the signal which has passed through the band-pass filter 15b and a signal generated by a frequency synthesizer 15d are mixed and converted to a baseband signal. The baseband signal is converted to a digital signal by an A/D converter (A/D) 15e and input to the RAKE receiver 16.

The RAKE receiver 16 is composed of a searcher 16a, fingers 16b, 16c and 16d, and a symbol combiner 16e. The digital signal is input to the searcher 16a and also to the fingers 16b, 16c and 16d.

The searcher 16a despreads the digital signal at various timings by using the same spread code as that used for the spreading on the transmitting side, in order to execute the detection of signals arriving through a plurality of paths from the base station to its own terminal, or what is called multi-pass detection.

The searcher 16a obtains Ec/Io of a plurality of paths and a delayed time difference (delay profile) of these paths from the result of the despreading. On the basis of these, the searcher 16a obtains a receiving timing (despread timing) of a path suitable for the reception and assigns it to each of the fingers 16b, 16c and 16d.

The fingers 16b, 16c and 16d despread the digital signal by using the same spread code as that used for the spreading on the transmitting side, at the despreading timings assigned by the searcher 16a.

The symbol combiner 16e symbolically combines the multi-pass components respectively despread by fingers 16b, 16c and 16d by considering the despreading timings assigned to the respective fingers 16b, 16c and 16d.

The signal symbolically combined in the symbol combiner 16e is subjected to the demodulation corresponding to the digital modulation of the transmitting side in a signal processing section 17 of the subsequent stage and thereby the receiving data is reproduced.

The control section 100 contains a CPU, ROM, RAM and the like. In accordance with the control program and the control data stored in the ROM, the CPU controls the respective sections of the mobile radio terminal apparatus, for example, the hand-off operation.

In addition, the control section 100 comprises receiving energy estimating means 100a and switch change control means 100b to implement new control functions.

The receiving energy estimating means 100a estimates which of Ec/Io of the signals received by the first antenna 10 and the second antenna 18 is greater, in accordance with Ec/Io of the receiving signals obtained respectively by the searcher 16a and the fingers 16b, 16c and 16d.

The switch change control means 100b controls the change of the switch 20 to change the antenna used for the communication from the first antenna 10 to the second antenna 18 or from the second antenna 18 to the first antenna 10, in accordance with the result of the discrimination executed by the receiving energy estimating means 100a.

A power supply section having a battery for supplying the power to operate the respective sections as described above exists as one of the constituent elements of the present apparatus though not shown.

Next, the antenna change control operation in the mobile radio terminal apparatus constituted as described above will be explained. The control operation is executed by the control section 100.

First, the antenna change control operation at the outgoing or incoming call time will be explained. FIG. 4 is a flow chart explaining the control operation. This control operation is started when the user successively receives the signals from the base station via a paging channel by making a request for outgoing call via user interface (not shown) or receiving an incoming call signal from the base station.

At step 4a, the signal from the base station is received via a paging channel, Ec/Io of the pilot channel is detected and the process shifts to step 4b. At this time, either the first antenna 10 or the second antenna 18 is selected by the switch 20 ands the receiving signal of the selected antenna is used by the receiving device 13a.

At step 4b, the receiving energy estimating means 100a estimates whether or not Ec/Io detected at step 4a is smaller than a preset threshold value. If Ec/Io detected at step 4a is smaller than a preset threshold value, the process shifts to step 4c. If Ec/Io is equal to or greater than a preset threshold value, the process shifts to step 4g.

At step 4c, the switch change control means 100b controls the change of the switch 20 to change it to either the first antenna 10 or the second antenna 18, which has not been selected at step 4a. The process shifts to step 4d.

At step 4d, the signal from the base station is received via the paging channel by the antenna selected at step 4c and Ec/Io of the pilot channel is detected. The process shifts to step 4e.

At step 4e, Ec/Io detected at step 4d is compared with Ec/Io detected at step 4a. If Ec/Io detected at step 4d is greater, the process shifts to step 4g. If Ec/Io detected at step 4d is not greater, the process shifts to step 4f.

At step 4f, the switch change control means 100b controls the change of the switch 20 to change it to either the first antenna 10 or the second antenna 18, which has been selected at step 4a. The process shifts to step 4g.

At step 4g, it is estimated whether or not the outgoing or incoming call operation that has caused the process to be started has been completed. If the operation has been completed, the process is ended. If the operation has not been completed, the process shifts to step 4a.

Next, the antenna change control operation at the communication will be explained. FIG. 5 is a flow chart explaining the control operation. This control operation is started when the communication is started by establishing the communication link with the base station and the signals from the base station are successively received at a traffic channel.

At step 5a, the signals from the base station are successively received via a traffic channel, Ec/Io of the pilot channel is detected and the process shifts to step 5b. At this time, either the first antenna 10 or the second antenna 18 is selected by the switch 20 ands the receiving signal of the selected antenna is used by the receiving device 13a.

At step 5b, the receiving energy estimating means 100a estimates whether or not Ec/Io detected at step 5a is smaller than a preset threshold value. If Ec/Io detected at step 5a is smaller than a preset threshold value, the process shifts to step 5c. If Ec/Io is equal to or greater than the preset threshold value, the process shifts to step 5g.

At step 5c, the switch change control means 100b controls the change of the switch 20 to change it to either the first antenna 10 or the second antenna 18, which has not been selected at step 5a. The process shifts to step 5d.

At step 5d, the signals from the base station are successively received via the traffic channel by the antenna selected at step 5c and Ec/Io of the pilot channel is detected. The process shifts to step 5e.

At step 5e, Ec/Io detected at step 5d is compared with Ec/Io detected at step 5a. If Ec/Io detected at step 5d is greater, the process shifts to step 5g. If Ec/Io detected at step 5d is not greater, the process shifts to step 5f.

At step 5f, the switch change control means 100b controls the change of the switch 20 to change it to either the first antenna 10 or the second antenna 18, which has been selected at step 5a. The process shifts to step 5g.

At step 5g, it is estimated whether or not the communication, which has caused the process to be started has been ended. If the communication has been ended, the process is ended. If the communication has not been completed, the process shifts to step 5a.

Figure 6:
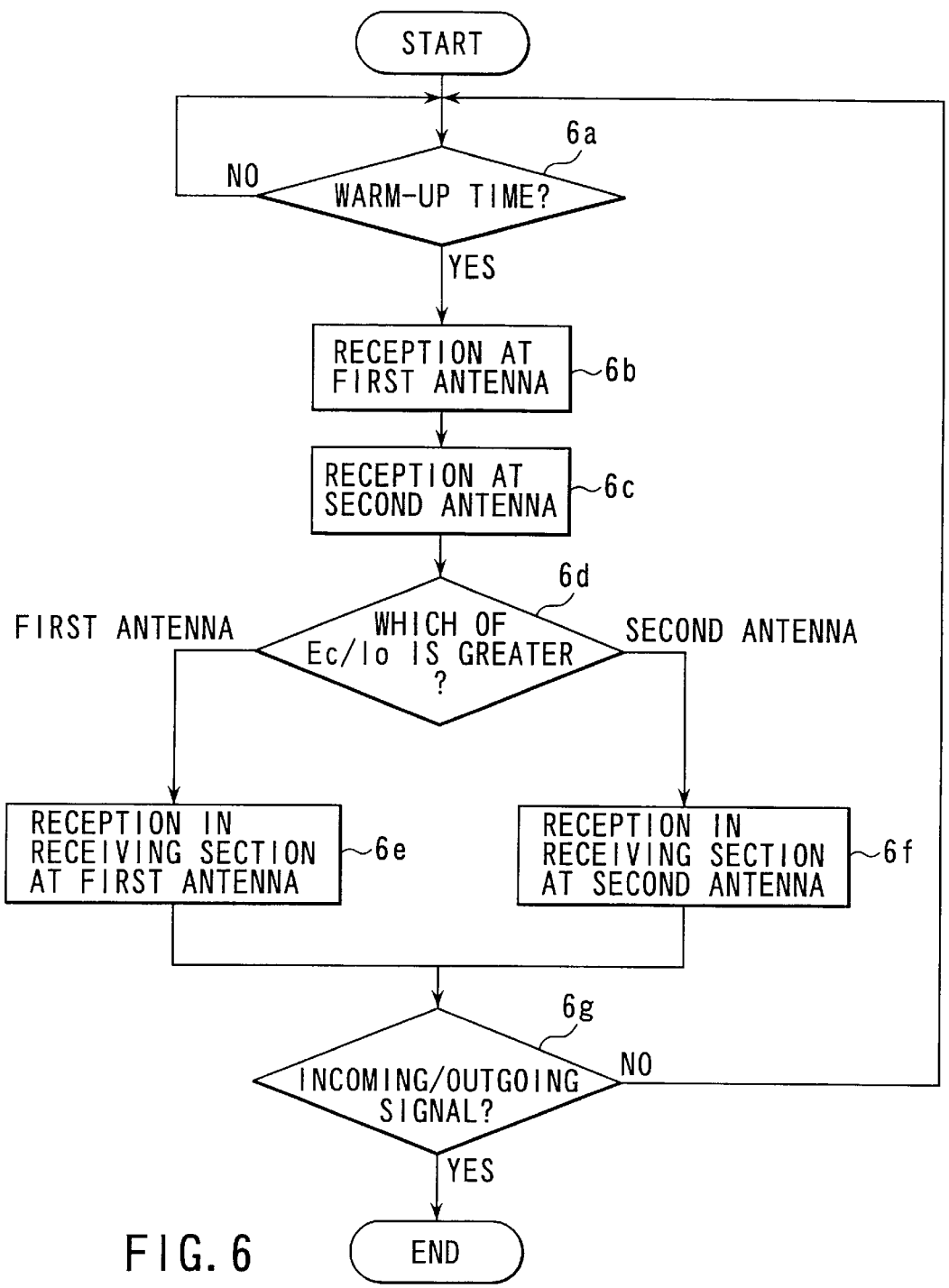
FIG. 6 is a flow chart explaining an antenna change control operation at the calling standby time in the mobile radio terminal apparatus shown in FIG. 3.
Figure 7:
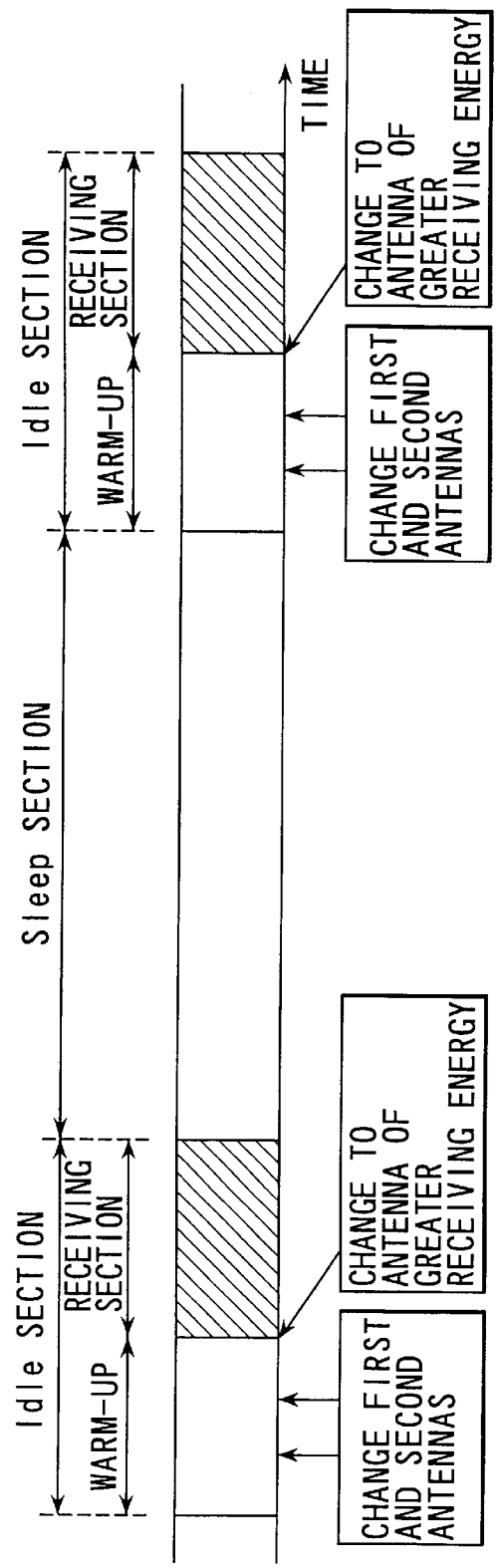
FIG. 7 is a flow chart explaining an intermittent reception and an antenna change control operation at the calling standby time in the mobile radio terminal apparatus shown in FIG. 3.

Next, the antenna change control operation at the incoming call standby time will be explained. FIG. 6 is a flow chart explaining the control operation. At the incoming call standby time, the signal from the base station is intermittently received at a paging channel as shown in FIG. 7.

In this figure, the signal of the paging channel is received in an Idle section while the power supply of the receiving device 13a is turned off in a Sleep section. The Idle section is composed of a warm-up time maintained by the time when the operation of the receiving device 13a turned on becomes stable and a receiving section in which the incoming signal is to be monitored.

First, at step 6a, it is estimated whether or not the current timing is in the warm-up time. If the current timing is in the warm-up time, the process shifts to step 6b. If the current timing is not in the warm-up time, the process shifts again to step 6a to stand by the arrival of the warm-up time.

At step 6b, the switch change control means 100b controls the change of the switch 20 to detect Ec/Io of the pilot channel of the paging channel via the first antenna 10 within the warm-up time. The process shifts to step 6c.

At step 6c, the switch change control means 100b controls the change of the switch 20 to detect Ec/Io of the pilot channel of the paging channel via the second antenna 18 within the warm-up time. The process shifts to step 6d.

At step 6d, the receiving energy estimating means 100a estimates which of Ec/Io detected via the first antenna 10 at step 6b and Ec/Io detected via the second antenna 18 at step 6c is greater.

If Ec/Io detected via the first antenna 10 at step 6b is greater, the process shifts to step 6e. If Ec/Io detected via the second antenna 18 at step 6c is greater, the process shifts to step 6f.

At step 6e, the switch change control means 100b controls the change of the switch 20 to execute the reception in the receiving section via the first antenna 10. The process shifts to step 6g.

At step 6f, the switch change control means 100b controls the change of the switch 20 to execute the reception in the receiving section via the second antenna 18. The process shifts to step 6g.

At step 6g, it is estimated whether or not there is a request for incoming call from the user or an incoming signal from the base station. If there is a request for incoming call from the user or an incoming signal from the base station, the process is ended. If there is not a request for incoming call from the user or an incoming signal from the base station, the process shifts to 6a.

As described above, if Ec/Io of the signal received via the selected antenna is lower than a present level, at the incoming and outgoing call time or at the communication time, the reception is temporarily executed via the other antenna and Ec/Io is detected. After that, the antenna having preferable Ec/Io is employed for the reception.

That is, if there is fear that Ec/Io may be temporarily deteriorated by the multipass fading and thereby stable communication quality cannot be maintained, at the incoming and outgoing call time or at the communication time, the antenna having preferable Ec/Io is employed for the reception.

If the Rake reception cannot be executed or the reflected wave cannot be reproduced since the reflected wave delayed from the direct wave is not delayed more than a determined value (reciprocal of the chip rate), the reflected wave and the signals coming from the other base stations become interference waves and Ec/Io is thereby deteriorated.

For this reason, if the antenna having preferable Ec/Io (or, for example, different in directivity) is employed for the reception in a case where Ec/Io is deteriorated and thereby stable communication quality cannot be maintained, there will be better possibility of receiving the reflected wave delayed from the direct wave at more than a determined value.

Therefore, according to the mobile radio terminal apparatus constituted as described above, stable communication quality can be maintained even under the radio wave condition causing terrible fading, at the incoming and outgoing call time or at the communication time.

In addition, in the mobile radio terminal apparatus, in the incoming call standby state, two antennas are changed for the reception and Ec/Io is detected in the warm-up time, prior to the reception in the receiving section. After that, the antenna having preferable Ec/Io is employed in the receiving section.

Therefore, according to the mobile radio terminal apparatus constituted as described above, stable communication quality can be maintained even in the radio wave condition that terrible fading occurs, at the incoming call standby time.

The present invention is not limited to the above embodiment. In the above-constituted embodiment, when Ec/Io of the signal received via the selected antenna is more deteriorated than a preset level, the reception is temporarily executed by employing the other antenna and Ec/Io is detected.

Instead, however, when the hand-off conditions are satisfied, when the base station cannot receive the signals, or when a predetermined number of frame errors sequentially occur, the same advantage can also be obtained even if the reception is temporarily executed via the other antenna to detect Ec/Io and the antenna having preferable Ec/Io is employed for the reception.

Figure 8:
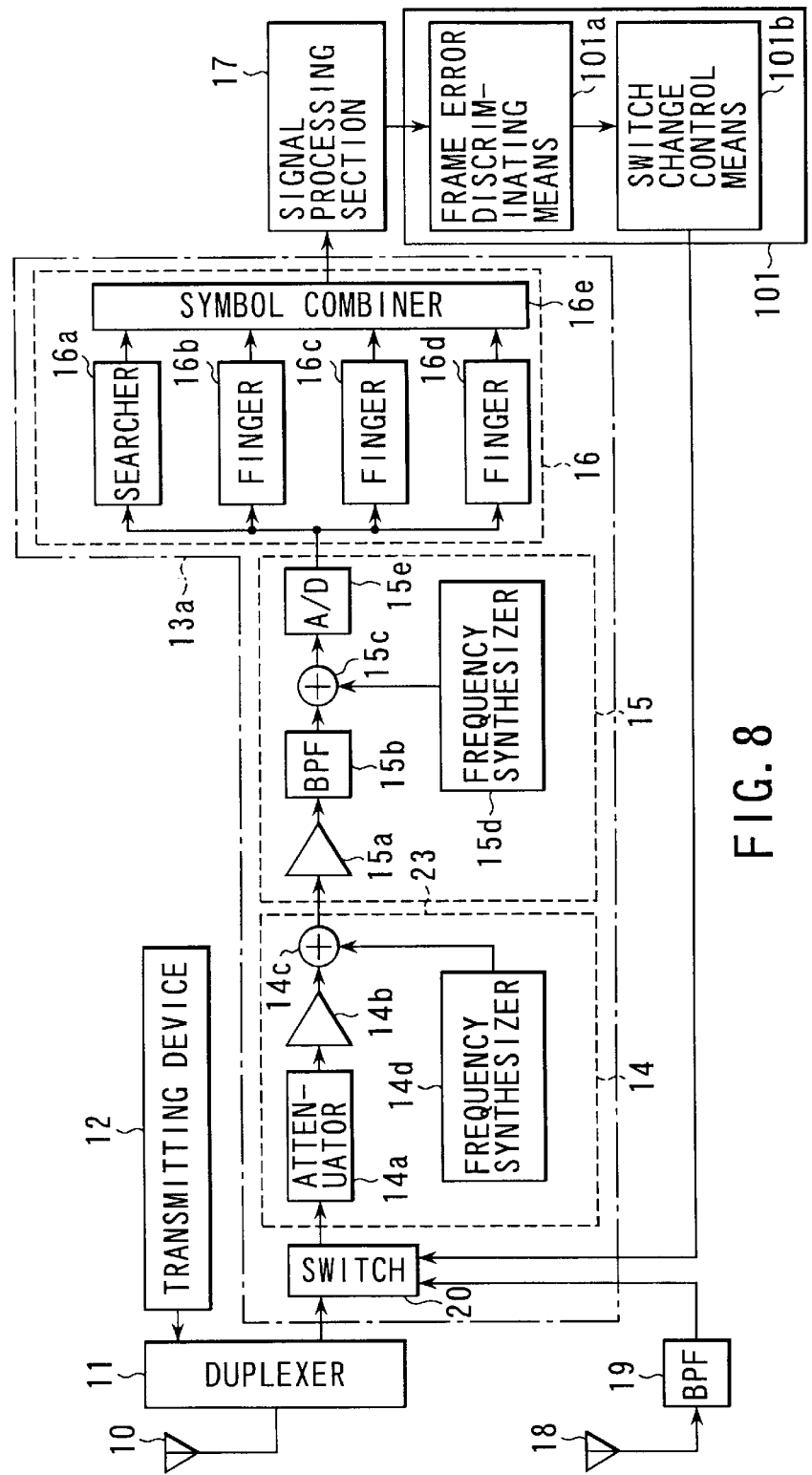
FIG. 8 is a block diagram showing a configuration of a mobile radio terminal apparatus in the CDMA scheme according to the second embodiment of the present invention.

Next, a mobile radio terminal apparatus in the CDMA scheme according to the second embodiment of the present invention will be explained. FIG. 8 illustrates the configuration thereof. In FIG. 8, the same portions as those in FIG. 1 that illustrates the configuration of the conventional mobile radio terminal apparatus in the CDMA scheme are denoted by the same reference numerals, and the receiving system of the present invention will be particularly explained here.

A transmitting device 12 modulates the transmission data of the speech communication, data communication and the like in the digital modulation scheme such as the PSK modulation and spreads the modulated data to a broad-band baseband signal by using a spread code.

Then, the transmitting device 12 up-converts the baseband signal to a radio-frequency signal, inputs the signal to a first antenna 10 via a duplexer 11, and irradiates the signal into the space from the first antenna 10 to transmit the signal to a base station (not shown).

On the other hand, the radio signal transmitted from the base station is received by the first antenna 10 and input to a receiving device 13b via the duplexer 11. The receiving device 13a is composed of a switch 20, a radio circuit 14, an intermediate frequency circuit 15 and a Rake receiver 16.

First, the receiving signal which is input from the duplexer 11 and a receiving signal which is received by a second antenna 18 and limited in a desired band by a band-pass filter (BPF) 19 are input to the switch 20. The change operation is controlled by a control section 101 to be described later and any one of the two receiving signals is input to the radio circuit 14.

The second antenna 18 is provided inside a casing of the mobile radio terminal apparatus.

In the radio circuit 14, the radio signal received from the switch 20 is input to an attenuator 14a, which attenuates the signal at a preset amount. The signal passing through the attenuator 14a is amplified up to a predetermined level by an amplifier 14b, and mixed with a local oscillation signal generated by a frequency synthesizer 14d in a mixer 14c. The mixed signal is down-converted to an intermediate frequency.

The signal down-converted to the intermediate frequency is input to the intermediate frequency circuit 15 and amplified up to a predetermined level by an amplifier 15a. A desired band, of the result of the amplification, passes through a band-pass filter (BPF) 15b and is input to a mixer 15c.

In the mixer 15c, the signal which has passed through the band-pass filter 15b and a signal generated by a frequency synthesizer 15d are mixed and converted to a baseband signal. The baseband signal is converted to a digital signal by an A/D converter (A/D) 15e and input to the RAKE receiver 16.

The RAKE receiver 16 is composed of a searcher 16a, fingers 16b, 16c and 16d, and a symbol combiner 16e. The digital signal is input to the searcher 16a and also to the fingers 16b, 16c and 16d.

The searcher 16a despreads the digital signal at various timings by using the same spread code as that used for the spreading on the transmitting side, in order to execute the detection of signals arriving through a plurality of paths from the base station to its own terminal, or what is called multi-pass detection.

The searcher 16a obtains Ec/Io of a plurality of paths and a delayed time difference (delay profile) of these paths from the result of the despreading. On the basis of these, the searcher 16a obtains a receiving timing (despread timing) of a path suitable for the reception and assigns it to each of the fingers 16b, 16c and 16d.

The fingers 16b, 16c and 16d despread the digital signal by using the same spread code as that used for the spreading on the transmitting side, at the despreading timings assigned by the searcher 16a.

The symbol combiner 16e symbolically combines the multi-pass components respectively despread by fingers 16b, 16c and 16d by considering the despreading timings assigned to the respective fingers 16b, 16c and 16d.

The signal symbolically combined in the symbol combiner 16e is subjected to the demodulation corresponding to the digital modulation of the transmitting side in a signal processing section 17 of the subsequent stage and thereby the receiving data is reproduced.

The control section 101 contains a CPU, ROM, RAM and the like. In accordance with the control program and the control data stored in the ROM, the CPU controls the respective sections of the mobile radio terminal apparatus, for example, the hand-off operation.

In addition, the control section 101 comprises frame error estimating means 101a and switch change control means 101b to implement new control functions.

The frame error estimating means 101a estimates whether or not frame errors of the receiving data are sequential in more than a predetermined number of frames, by using the CRC check bit contained in the receiving data demodulated in the signal processing section 17.

The switch change control means 101b controls the change of the switch 20 to change the antenna used for the communication from the first antenna 10 to the second antenna 18 or from the second antenna 18 to the first antenna 10, in accordance with the result of the discrimination executed by the frame error estimating means 101a.

A power supply section having a battery for supplying the power to operate the respective sections as described above exists as one of the constituent elements of the present apparatus though not shown.

Next, the antenna change control operation of the mobile radio terminal apparatus having the above structure will be explained. This control operation is executed by the above-described control section 101.

The antenna change control operation at the outgoing or incoming call time is first explained. FIG. 9 is a flow chart showing the control operation. This control operation is started when the user makes a request for outgoing call via user interface (not shown) or when the user receives an incoming signal from the base station and also receives the signal from the base station via the paging channel.

At step 9a, the paging channel is scanned to specify the base station, and the process shifts to step 9b.

At step 9b, the signal from the base station is received via the paging channel, and the process shifts to step 9c. At this time, any one of the first antenna 10 and the second antenna 18 is selected by the switch 20, and the receiving signal from the selected antenna is used at the receiving device 13a.

At step 9c, the frame error estimating means 101a estimates whether or not frame errors of the receiving data are successive in more than a predetermined number of frames, by using the CRC check bit included in the receiving data demodulated by the signal processing section 17.

If frame errors are successive in more than a predetermined number of frames, the process shifts to step 9d. If frame errors are not successive in more than a predetermined number of frames, the process shifts to step 9a.

At step 9d, the switch change control means 101b controls the change of the switch 20 to change the antenna for use in the communication from the currently used antenna to the antenna, which has not been used, and the process shifts to step 9e.

At step 9e, the frame error estimating means 101a estimates whether or not frame errors of the receiving data are successive in more than a predetermined number of frames, on the basis of the receiving signal obtained via the antenna changed at step 9d, by using the CRC check bit included in the receiving data demodulated by the signal processing section 17.

If frame errors are successive in more than a predetermined number of frames, the process shifts to step 9a. If frame errors are not successive in more than a predetermined number of frames, the process shifts to step 9f.

At step 9f, it is estimated whether or not the outgoing or incoming call operation, which has caused this process to be started, has been completed. If the operation has been completed, the process is ended. If the operation has not yet been completed, the process shifts to step 9a.

Next, the antenna change control operation at the communication time is explained. FIG. 10 is a flow chart showing the control operation. This control operation is started when the communication are started by establishing the communication link with the base station and the signals from the base station are successively received via the traffic channel.

At step 10a, the signals from the base station are successively received via the traffic channel and the process shifts to step 10b. At this time, any one of the first antenna 10 and the second antenna 18 is selected by the switch 20 and the receiving signals from the selected antenna are used in the receiving device 13a.

At step 10b, the frame error estimating means 101a estimates whether or not frame errors of the receiving data are successive in more than a predetermined number of frames, by using the CRC check bit included in the receiving data demodulated by the signal processing section 17.

If frame errors more than a predetermined number of frames are successive, the process shifts to step 10c. If frame errors are not successive in more than a predetermined number of frames, the process shifts to step 10a.

At step 10c, the switch change control means 10b controls the change of the switch 20 to change the antenna for use in the communication from the currently used antenna to the antenna, which has not been used, and the process shifts to step 10d.

At step 10d, the frame error estimating means 101a estimates whether or not frame errors of the receiving data are successive in more than a predetermined number of frames, on the basis of the receiving signals obtained via the antenna changed at step 10c, by using the CRC check bit included in the receiving data demodulated by the signal processing section 17.

If frame errors are successive in more than a predetermined number of frames, the process shifts to step 10a. If frame errors are not successive in more than a predetermined number of frames, the process shifts to step 10e.

At step 10e, it is estimated whether or not the communication, which has caused this process to be started, has ended. If the communication has ended, the process is ended. If the communication has not yet ended, the process shifts to step 10a.

At step 10f, the operation to end the communication is executed and the process is ended.

Figure 11:
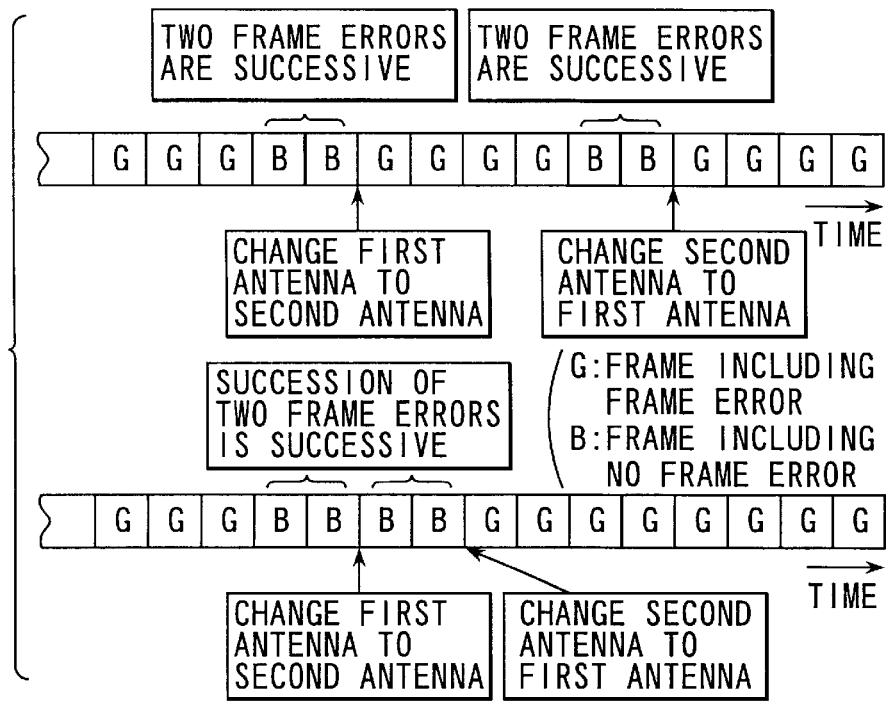
FIG. 11 is a flow chart explaining an antenna change control operation at the calling standby time in the mobile radio terminal apparatus shown in FIG. 8.

As described above, the above-constituted mobile radio terminal apparatus comprises two antennas 10 and 18, and receives the signals in the paging channel at the incoming and outgoing call time or in the traffic channel at the communication time, by selecting the antennas at the respective times. If more than a predetermined number of the frame errors of the receiving signals are successive (in more than 2 frames in an example of FIG. 11), the apparatus executes the receiving operation by changing the antenna currently used to the other antenna, as shown in FIG. 11.

That is, if more than a predetermined number of frame errors become successive even temporarily by the multipass fading and thereby stable communication quality cannot be maintained, at the incoming and outgoing call time or the communication time, the signals are received by employing the other antenna.

Figure 12:
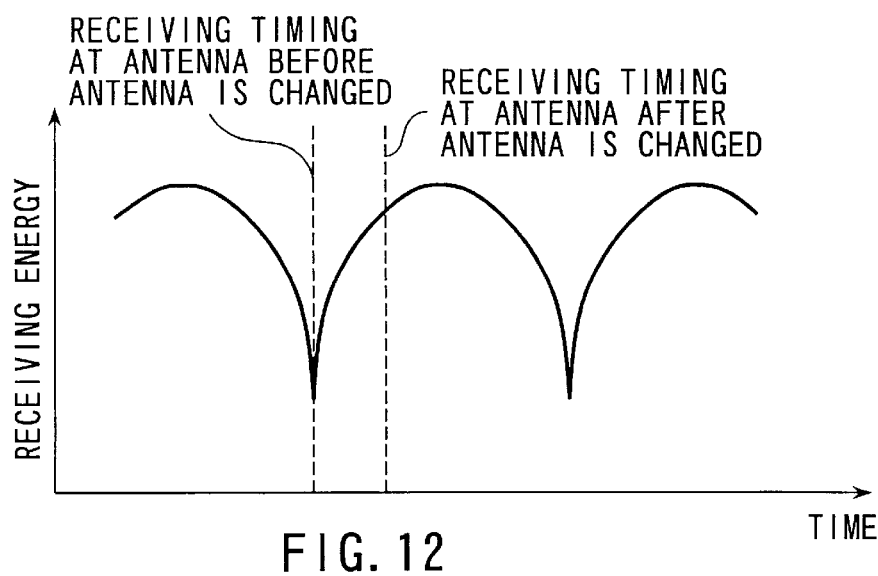
FIG. 12 is a flow chart explaining an antenna change control operation at the calling standby time in the mobile radio terminal apparatus shown in FIG. 8.

Thus, since the position where the RF signal from the space is received is varied in accordance with the distance between two antennas, the receiving timing is varied before and after the change of the antennas as shown in FIG. 12 and the other antenna may be able to receive the RF signal having little influence of fading after the change of the antennas.

Therefore, according to the above-constituted mobile radio terminal apparatus, stable communication quality can be maintained and the system lost can be prevented even in the radio wave condition that terrible fading occurs, at the incoming and outgoing call time or at the communication time.

Thus, the interruption of communication during the communication time, display of "out of communication range" at the standby time, waste of the battery required to capture the system, etc. can be prevented by preventing the system lost.

The present invention is not limited to the above embodiment. For example, in the embodiment, the signals are received via the other antenna in a case where more than a predetermined number of frame errors are successive. Instead, the same advantage can be obtained even if the signals are received via the other antenna in a case where frame errors are successive in more than a predetermined time.

It is needless to say that the present invention can be variously modified in a range, which does not exceed the inventive gist of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mobile radio terminal apparatus capable of making a radio connection in CDMA (Code Division Multiple Access) scheme to one of a plurality of radio base stations connectable to a communication network to conduct communication with a communication station in said communication network, said apparatus comprising:

two antennas;

antenna selection means for selecting one or the other of said two antennas as an antenna which is to be used, in accordance with a control signal;

frame error estimating means for demodulating a signal received via the antenna selected by said antenna selection means and estimating whether or not a predetermined number of frame errors are successively generated in a result of the demodulation; and antenna change control means, in a case where it is estimated by said frame error estimating means that a predetermined number of frame errors are successively generated, for supplying said control signal to said antenna selection means and changing the antenna in use from the antenna selected by said antenna selection means to the other antenna.

2. A mobile radio terminal apparatus capable of making a radio connection in CDMA (Code Division Multiple Access) scheme to one of a plurality of radio base stations connectable to a communication network to conduct communication with a communication station in said communication network, said apparatus comprising:

two antennas;

antenna selection means for selecting one or the other of said two antennas as an antenna which is to be used, in accordance with a control signal;

frame error estimating means for demodulating a signal received via the antenna selected by said antenna selection means and estimating whether or not frame errors are successively generated in a result of the demodulation in more than a predetermined time; and antenna change control means, in a case where it is estimated by said frame error estimating means that frame errors are successively generated during more than a predetermined period, for supplying said control signal to said antenna selection means and changing the antenna in use from the antenna selected by said antenna selection means to the other antenna.

3. A mobile radio terminal apparatus according to any one of claims 1 and 2, wherein said frame error estimating means estimates whether or not frame errors are successively generated in a paging channel.

4. A mobile radio terminal apparatus according to any one of claims 1 and 2, wherein said frame error estimating means estimates whether or not frame errors are successively generated in a traffic channel.

* * * * *